(12) United States Patent
Polka

(10) Patent No.: US 12,077,016 B2
(45) Date of Patent: Sep. 3, 2024

(54) TWIST AND LOCK MOUNTING SYSTEM FOR VEHICLE WHEEL COVER

(71) Applicant: REALWHEELS CORPORATION, Gurnee, IL (US)

(72) Inventor: John G. Polka, Green Oaks, IL (US)

(73) Assignee: REALWHEELS CORPORATION, Zion, IL (US)

( * ) Notice: Subject to any disclaimer, the term of this patent is extended or adjusted under 35 U.S.C. 154(b) by 490 days.

(21) Appl. No.: 17/395,948

(22) Filed: Aug. 6, 2021

(65) Prior Publication Data
US 2022/0041009 A1 Feb. 10, 2022

Related U.S. Application Data

(60) Provisional application No. 63/062,873, filed on Aug. 7, 2020.

(51) Int. Cl.
*B60B 7/06* (2006.01)
*B60B 7/00* (2006.01)
*B60B 7/08* (2006.01)

(52) U.S. Cl.
CPC ............ *B60B 7/068* (2013.01); *B60B 7/0013* (2013.01); *B60B 7/08* (2013.01); *B60B 2360/102* (2013.01)

(58) Field of Classification Search
CPC ......... B60B 7/068; B60B 7/0013; B60B 7/08; B60B 7/04; B60B 2360/102
See application file for complete search history.

(56) References Cited

U.S. PATENT DOCUMENTS

| | | | | |
|---|---|---|---|---|
| 3,248,915 A | * | 5/1966 | Scheiman | B60B 7/16 70/168 |
| 3,918,764 A | * | 11/1975 | Lamme | B60B 7/16 301/37.21 |
| 5,494,336 A | * | 2/1996 | Russell | B60B 7/14 301/108.4 |
| 7,059,684 B1 | * | 6/2006 | Polka | B60B 7/068 301/37.371 |
| 11,198,322 B2 | * | 12/2021 | Fleck | B60B 7/04 |
| 2010/0270853 A1 | * | 10/2010 | Smith | B60B 7/04 301/37.26 |
| 2013/0015698 A1 | * | 1/2013 | Butler | B60B 7/06 301/37.29 |
| 2014/0284994 A1 | * | 9/2014 | Polka | B60B 7/068 301/37.102 |
| 2015/0210110 A1 | * | 7/2015 | Rose | B60B 7/04 301/37.28 |

* cited by examiner

*Primary Examiner* — S. Joseph Morano
*Assistant Examiner* — Emily G. Castonguay
(74) *Attorney, Agent, or Firm* — Pauley Erickson & Swanson

(57) ABSTRACT

A wheel cover assembly for a truck wheel includes a plate system adapted to mount on a wheel hub along existing wheel bolts. A convex cover slideably engages with the plate system. The convex cover has a generally planar fastening plate and an integrated skirt that tapers to an edge of the wheel. A plurality of pins are integrated with the plate system to receive the convex cover.

20 Claims, 8 Drawing Sheets

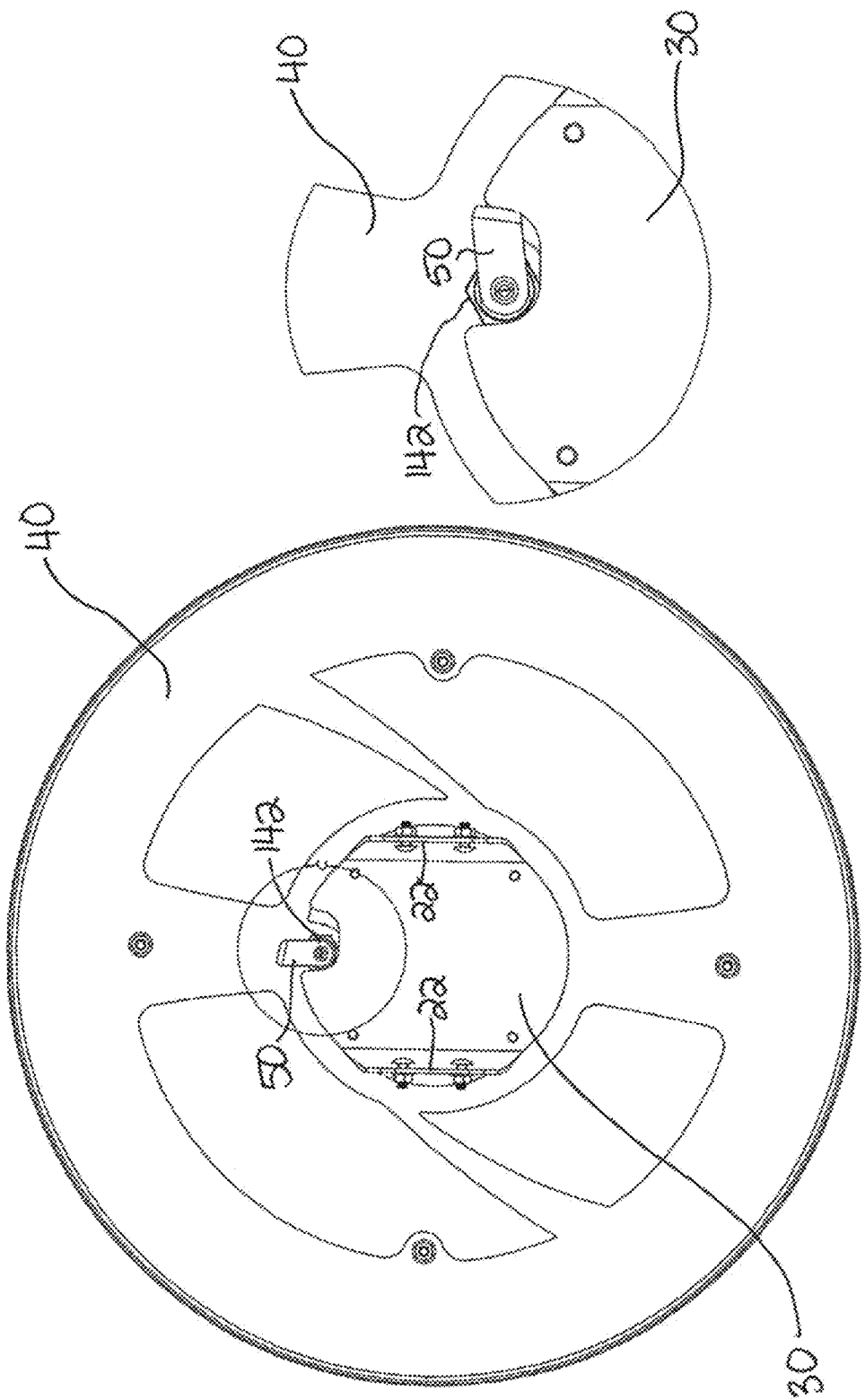

TWIST AND LOCK MOUNTING SYSTEM FOR VEHICLE WHEEL COVER

CROSS REFERENCE TO RELATED APPLICATION(S)

This application claims the benefit of U.S. Provisional Application Ser. No. 63/062,873, filed on 7 Aug. 2020. The provisional application is hereby incorporated by reference herein in its entirety and is made a part hereof, including but not limited to those portions which specifically appear hereinafter.

BACKGROUND OF THE INVENTION

Field of the Invention

The present invention relates generally to mounting systems and, more particularly, to mounting systems and assemblies for wheels of a roadway vehicle such as a truck.

Description of Prior Art

Aerodynamic wheel covers are important accessories for improving the appearance and fuel mileage of over-the road vehicles such as 18-wheeler tractor-trailer rigs. Such rigs have deep-set wheels for carrying large tires for supporting the vehicle and its load, but they create significant drag as they move through the relatively still air along the highway. Reduction of the drag improves fuel mileage; and attractive wheel covers improve the appearance of the tractor or trailer to which they are fitted. Aside from tractor-trailer rigs, aerodynamic wheel covers can also be used for other vehicle/vehicle-related applications such as on motorhomes or RVs. Fuel efficiency of more rectangular vehicles such as coach busses, school busses, etc. can also be improved with the addition of aerodynamic wheel covers.

It has been necessary to provide after-market covers and attachment devices, each of which must fit a number of wheel, hub, and axle designs to be economically viable. The covers and attachment devices must be simple yet sturdy enough to be assembled and maintained by garage mechanics and to withstand the rigors of many thousands of miles of travel at high rotational speeds. As such, improved wheel covers are desired to achieve an overall better aesthetic and fuel efficiency for over-the-road vehicles.

SUMMARY OF THE INVENTION

An object of the present invention is to provide a simple yet sturdy and lockable attachment system for a cover of over-the-road truck wheels for both front and rear axles, particularly for the dual drive wheels of a tractor used to haul large-volume trailers, but also for trailers and other wheels.

A general object of the invention can be attained, at least in part, through a wheel cover assembly for a truck wheel. The wheel cover assembly includes a plate system to mount on a wheel hub along existing wheel bolts and a convex cover that slideably engages with the plate system. The convex cover has a generally planar fastening plate and an integrated skirt that tapers to an edge of the wheel. The wheel cover assembly also includes a plurality of pins integrated with the plate system that receive the convex cover.

The plate system of the wheel cover assembly includes a base plate affixed to a hub of the vehicle on which a wheel is also mounted, an upstanding bracket affixed to the base plate, and a top plate spring mounted to the bracket and positioned to engage the wheel cover. The plurality of pins extends between the bracket and the top plate.

The wheel cover includes keyhole apertures arranged circumferentially on the fastening plate for accepting the heads of the pins. The keyhole apertures have wider portions for engagement with the pins and narrower portions for engaging beneath heads of the pins upon rotation of the convex cover.

The wheel cover assembly also includes a locking pin carried on the bracket and engaging the wheel cover when fully assembled to prevent its reverse rotation and loosening from the bracket. The upstanding bracket is configured to adjust away from the base plate. There is also a height adjustment assembly in the bracket for adapting the assembly to wheels of different hub depths.

The wheel cover integrally carries a locking mechanism for preventing removal of the wheel cover from the wheel of the vehicle. The locking mechanism includes a keyed lock. The keyed lock is rotatable to engage the cover irremovably from the plate system.

The wheel cover assembly may also include one or more transparent windows formed in the convex cover. The transparent windows are located along the fastening plate to permit a user to view the hub without removal of the convex cover.

A general object of the invention can also be attained through a wheel cover assembly that includes a plate system adapted to mount on a wheel hub. The plate system includes a plurality of pins. The assembly includes a convex cover adapted to slideably engage with the plurality of pins on the plate system so that the convex cover is maintained in position by heads on the pins. The convex cover has a generally planar fastening plate for engagement with the pins and an integrated convex skirt that generally covers an associated wheel. A plurality of pins are integrated with the plate system to receive the convex cover. A central window is positioned in the fastening plate.

Other objects and advantages will be apparent to those skilled in the art from the following detailed description taken in conjunction with the appended claims and drawings.

BRIEF DESCRIPTION OF THE DRAWINGS

FIG. 5 shows a side plan view inside a wheel well of a knob or a keyed locked fitted to a wheel cover;

FIG. 6 shows a detailed view of the keyed locked of FIG. 5;

DESCRIPTION OF PREFERRED EMBODIMENTS

Embodiments of the subject invention include a base or bottom plate that fits over studs affixing a wheel hub to an end of a front or rear axle. Upstanding brackets are affixed to the base plate. The brackets can have a number of possible attachment holes for fixing an outer support member. The outer support member carries a top plate that is spring-loaded to the outer support member and is retained by a circularly spaced set of internally threaded pins having heads that bear on an outside of the top plate. Springs allow the top plate to move up and down on the pins, so as to engage and capture a wheel cover placed atop the top plate. In one embodiment, a locking pin, also spring-loaded, passes into a hole in the top plate to lock the top plate into its final operating position.

Once the base plate, brackets, and top plate are affixed to the hub, the wheel cover is placed over the pins, with circular parts of keyhole slots fitting over the pin heads. The wheel cover is then pressed against the top plate and the springs. The cover is then rotated to engage narrow portions of the keyhole slots beneath the heads of the pins and to align the locking pin with the hole in the top plate. The locking pin pops into position, locking the wheel cover against further rotation to prevent backing out of that plate from the attaching pins. The wheel with its cover and the truck to which they are attached are then ready for use. The wheel cover in some embodiments preferably does not contact the rim of the wheel but floats a short distance outwardly from it.

In some embodiments the locking pin may be replaced or supplemented with a push-button, turned knob, or a keyed lock fitted integrally with the wheel cover to firmly engage a mounting structure within a wheel well on which the cover is mounted.

Figure 1:
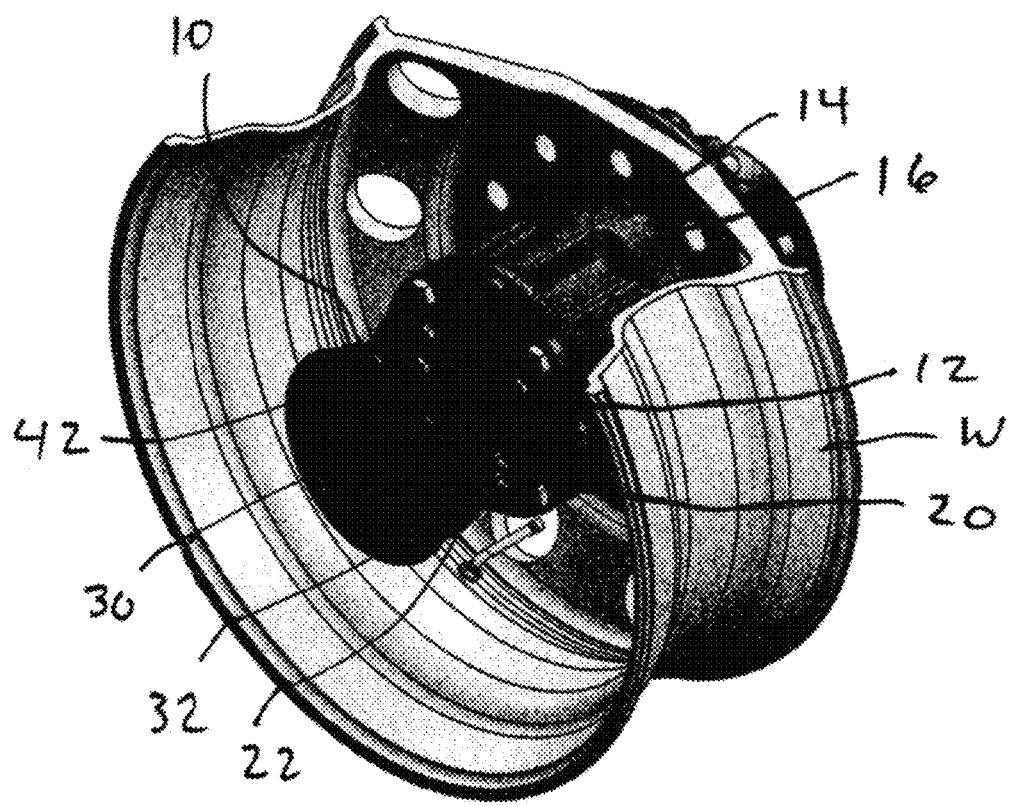
FIG. 1 shows a perspective view of a mounting bracket on a hub of a dual wheel system.

FIG. 1 shows a wheel cover assembly 11 for a wheel W of an over-the-road truck. An adjustable mounting bracket 10 is provided for holding an aerodynamic or decorative cover to the wheel W. The wheel W is preferably an outer drive wheel but other suitable wheels may also be used, such as wheels on a trailer. Such wheels have deep recesses within which air in a slipstream of a moving vehicle can eddy, causing drag and reducing the vehicle's fuel mileage.

Figure 2:
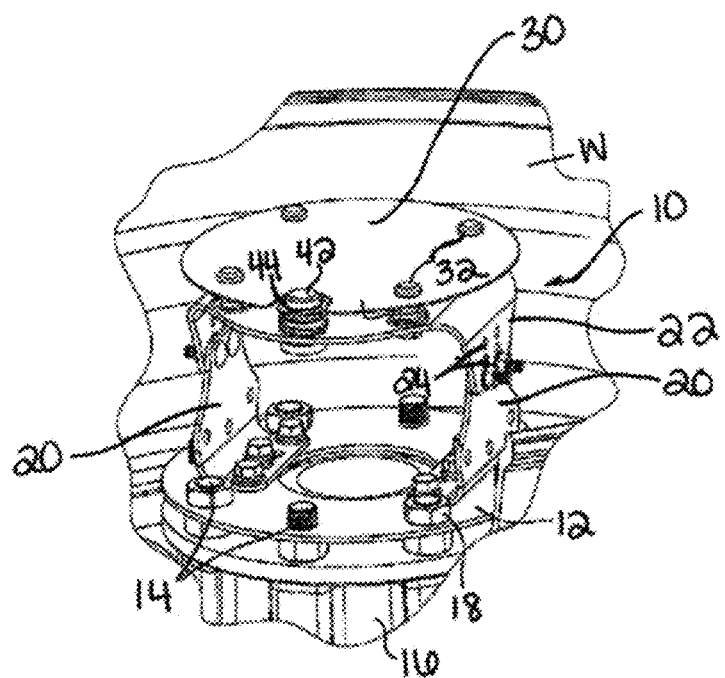
FIG. 2 shows a detailed side view of the mounting bracket according to FIG. 1.

FIG. 2 shows an additional detailed view of the bracket 10. As shown in FIGS. 1 and 2, the bracket 10 includes a bottom plate 12 that includes engagement holes to fit over and about ends of studs 14. The studs 14 extend from a hub 16 of the wheel W. One or more of the studs 14 includes nuts 18 to affix the bottom plate 12 securely to the hub 16. The bracket is preferably adjustable to fit various axle hub combinations within wheels without interfering with necessary inspection and/or maintenance of the tire, wheel, hub, and/or axle associated with the bracket.

Upstanding brackets 20 are affixed to the bottom plate 12 with bolts and lock washers. The bolts are threaded into apertures in the bottom plate 12. An upper part of each bracket 20 carries a pair of bolts for affixing a top or upper bracket 22 to the brackets 20. In order to accommodate wheels and hubs of different depths, the top bracket 22 has a series of pairs of height adjustment apertures 24 for joining the upstanding brackets 20 and the top bracket 22 together so that the wheel cover will be properly spaced apart from, and relative to, the rim of the wheel W upon final assembly.

Carried atop the top bracket 22 is a top plate 30 that is spring-loaded to the top bracket 22 with springs wrapped around aero bolts 32. Each bolt 32 has a head, which bears on and limits the upward movement of the top plate 30. Each bolt 32 is also internally threaded and affixed to the upper bracket 22 by a stud bearing on an underside of the upper bracket 22. Coil springs 34 are inserted between the upper bracket 22 and the top plate 30 about each of the bolts 32. The coil springs 34 bias the top plate 30 upwardly against the heads of the bolts 32. Pressing evenly on the top plate 30 against the springs 34 moves the plate downwardly in the orientation of FIG. 2 for attachment of a wheel cover 40, as shown in FIG. 3.

Figure 3:
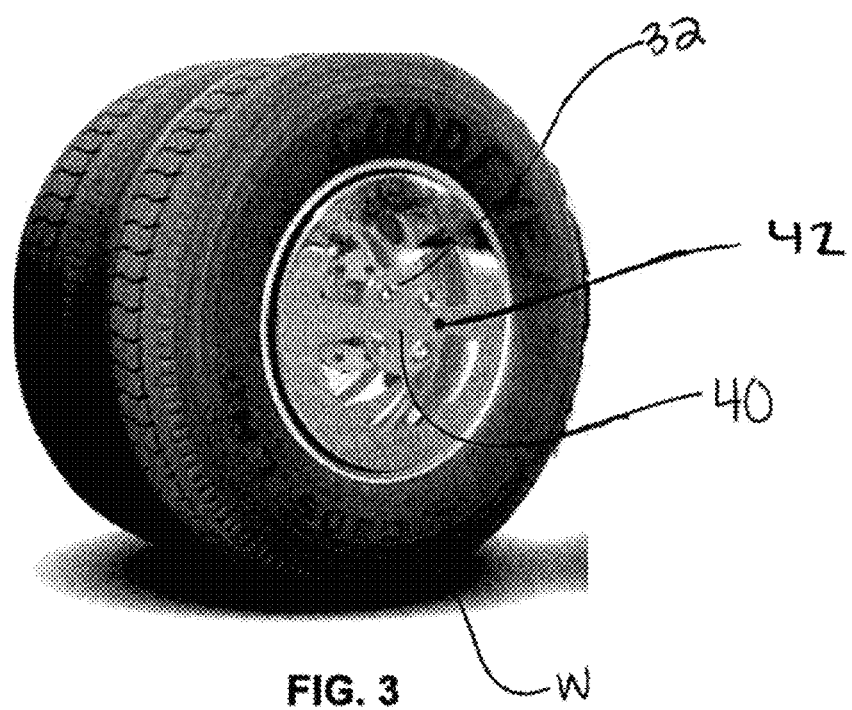
FIG. 3 shows a wheel cover on the mounting bracket according to FIG. 1.

FIG. 3 shows the wheel cover 40 that maneuvers with a twist and lock motion. Rotating the wheel cover 40 with respect to the wheel W and hub 16 engages the heads of the bolts 32 with narrow portions of keyhole slots in the wheel cover 40.

Figure 4:
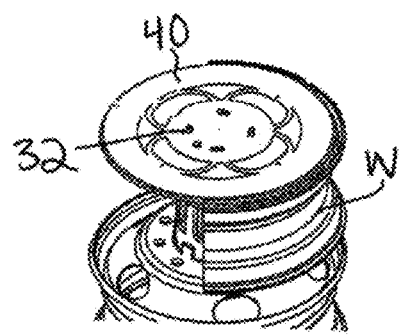
FIG. 4 shows a partial through view of a wheel and cover assembly.

FIG. 4 shows a completed assembly where part of the wheel W is cut away to show the internal hub 16.

To maintain the cover 40 firmly affixed adjacent to the wheel W via the mounting bracket assembly 10, an anti-rotation push pin 42 is provided on the upper bracket 22 top surface, as shown in FIGS. 1-3. The pin 42 is spring-loaded upwardly to engage into a cut-out locking aperture 44 (shown in FIG. 2) in the top plate 30 and in the cover 40 when the cover 40 is fully assembled. The cover is then easily detached from the wheel when necessary for inspection and cleaning, by pressing on the pin 42 and rotating the cover in the opposite direction to release the cover 40 from under the aero pin heads 32.

A positive locking, anti-removal device can also be provided in the wheel cover 40, either in place of or in addition to the push pin 42. The anti-removal device guards against unauthorized removal of the cover 40 from the wheel W and vehicle.

FIGS. 5 and 6 show a locking device 142. A locking tab 50 is attached to the locking device 142, in the position shown for assembly. The tab 50 is then rotated approximately 90 to 270 degrees via a knob or key to lock the wheel cover 40 to the top plate 30. After rotation, the key or knob is withdrawn from the locking device 142. This secures the wheel cover 40 to the mounting bracket assembly and top plate 30, firmly attaching the assembly to the wheel W.

Figure 7:
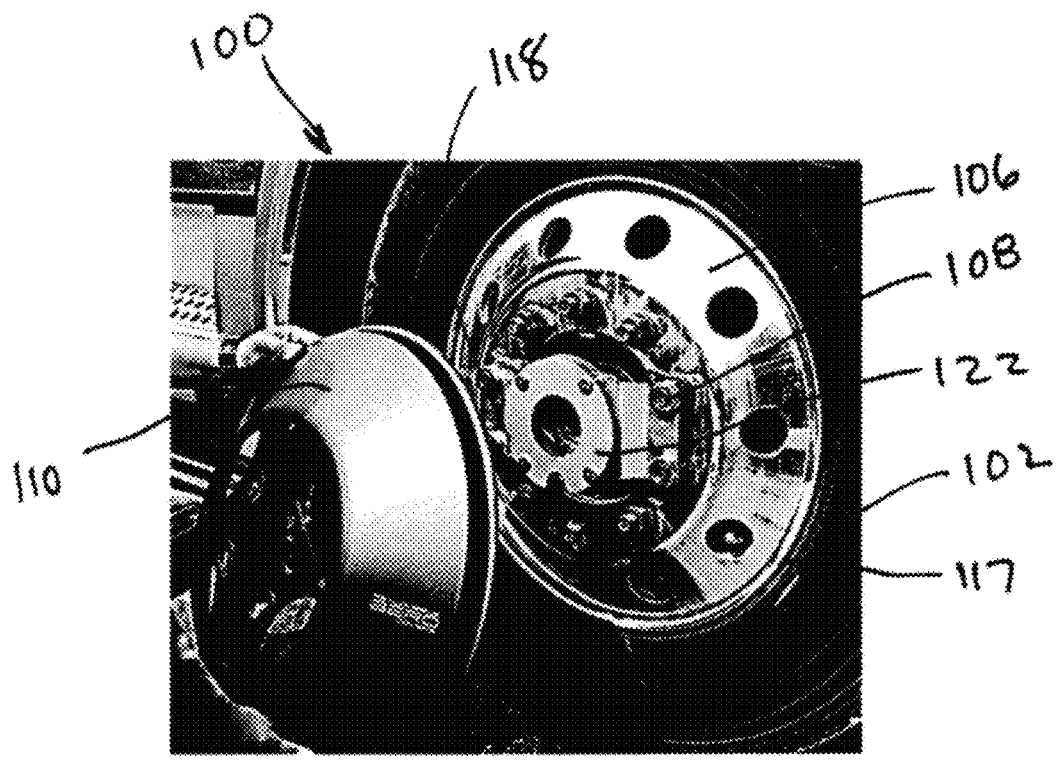
FIG. 7 shows a perspective view of a wheel cover assembly for mounting on a truck wheel according to one embodiment of the invention.

FIG. 7 shows a wheel cover assembly 100 for a truck wheel 102. The wheel cover assembly 100 includes a plate system 104 and a convex cover 110. The plate system 104 includes an assembly of parts that are connected to a wheel hub 106. A base plate 118 of the plate system 104 is connected to existing bolts 108 on the wheel hub. A top plate 122 of the plate system 104 is mounted on the base plate 118. The convex cover 110 is placed over the plate system 104 and covers the wheel hub 106 out to an edge 117 of the wheel 102.

The plate system 104 may be placed on top of four or more wheel studs so that the system rests on top of nuts of the wheel. The system can attach onto two studs each in a longitudinal row on opposite sides of the wheel. Four compatible jam nuts can then be attached onto the wheel studs to secure the plate system to the wheel. A socket or ratchet can be used to tighten the assembly.

Figure 8:
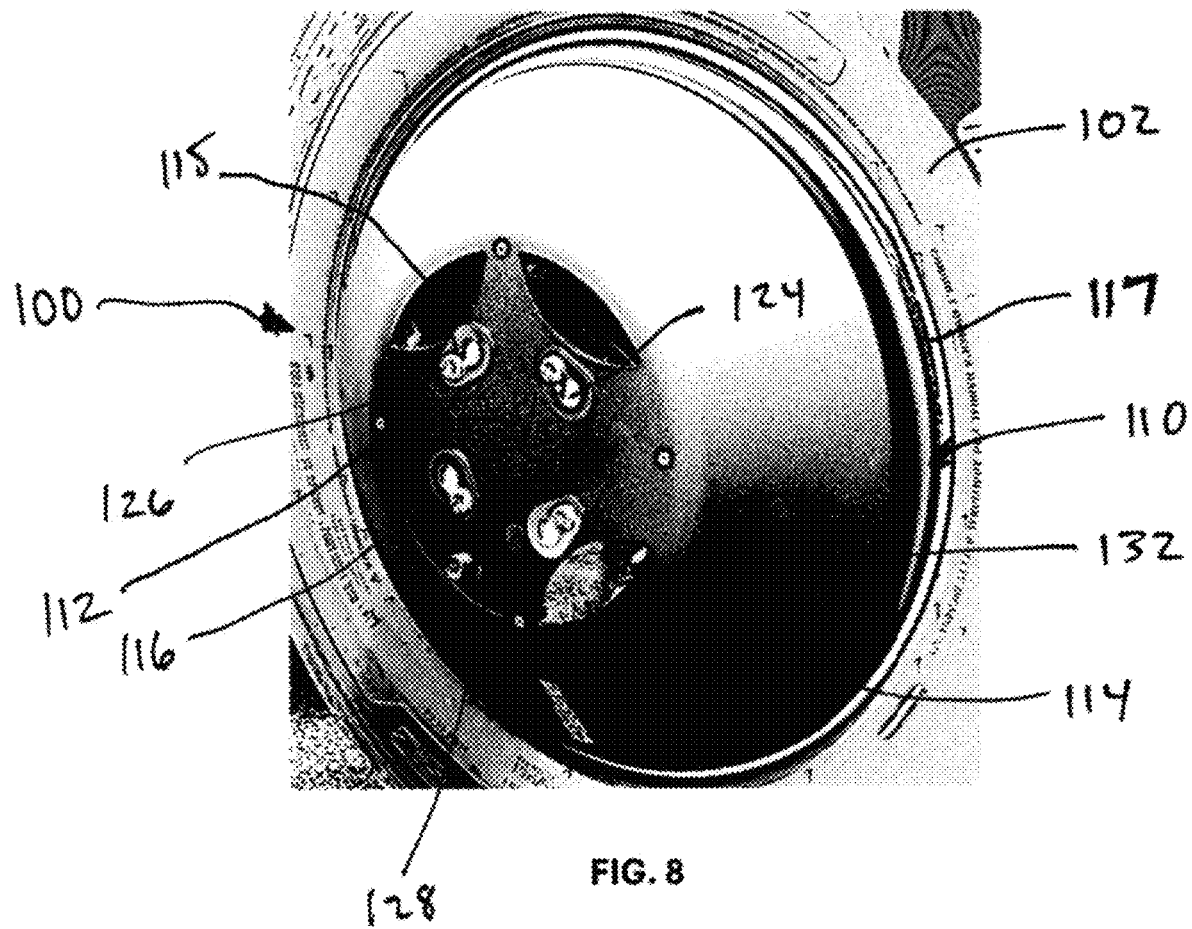
FIG. 8 shows a perspective view of a wheel cover assembly mounted on a wheel according to the embodiment shown in FIG. 7.

FIG. 8 shows the wheel cover assembly 102 fully assembled on the wheel 102. Adjacent to the edge 117 of the wheel, the convex cover 110 has an integrated skirt 114. The integrated skirt 114 meets with a fastening plate 112 on the cover 110. The fastening plate 112 is planar. The integrated skirt 114 surrounds the fastening plate 112 and the skirt 114 tapers from a perimeter of the fastening plate 112, down to the edge 117 of the wheel 102. Overall, the convex cover 110 floats over the wheel hub 106. An adjustable height of the plate system 104 allows the convex cover 110 to sit above the wheel hub 106, without actually making contact with the wheel hub 106, the wheel 102, or the edge 117 of the wheel.

The fastening plate 112 includes a plurality of keyhole apertures 124. A plurality of pins 116 protrude from the top plate 122, through the keyhole apertures 124. Heads 126 of the pins 116 are exposed through the keyhole apertures 124. The heads 126 bear on and limit the upward movement of the fastening plate 122. In some embodiments of the invention, washers 115 can be added to the pins above the keyhole apertures, below the heads of the pins (shown in more detail in FIG. 13 discussed below). The washers 115 can be added to lessen the wear and strengthen the longevity of the wheel cover assembly. For ease in assembly, when using the washers 115, the keyhole apertures 124 can include lead-ins 125 (shown later in FIG. 12). The lead-ins include a sloped portion on a inner edge of the keyhole apertures 124. The lead-ins 125 allow the heads 126 of the pins 116 to slide up over the washers 115. This allows for a smoother assembly when the cover 110 is placed over the plate system 104.

In addition, the convex cover may include a hardened stainless steel plate integrated with the fastening plate 112 with or without stainless steel washers to further prolong the use of the wheel cover assembly as the pins brush up against the underside of the fastening plate on the convex cover. As such, the fastening plate 112 may comprise hardened steel while the integrated skirt 114 does not. The entire fastening plate 112 may comprise hardened steel, or hardened steel may be added to an existing fastening plate 112. Such an example includes, but is not limited to, adding hardened steel to an underside 113 of the fastening plate 112 or adding a hardened steel ring to the fastening plate 112.

FIG. 8 also shows a locking pin 128 on the top plate 122 of the convex cover 110. The locking pin 128 protrudes from the plate system 104 and will be discussed in further detail below.

Figure 9A:
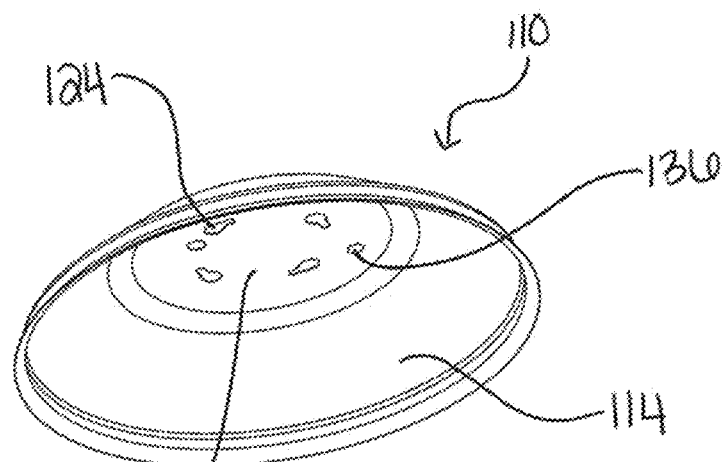
FIG. 9A shows an inner perspective view of a wheel cover assembly according to one embodiment of the invention.

FIG. 9A shows an underside perspective view of the convex cover 110. The keyhole apertures 124 are spaced equidistant around a portion of the top plate 122 of the cover 110. Other configurations of the keyhole apertures 124 are possible, as long as the apertures 124 mimic the placement of the pins 116 on the plate system 104. The keyhole apertures 124 each have a wider portion and a narrower portion. The wider portion of the keyhole apertures 124 is of like size and shape so that the heads 126 of the pins 116 can fit through the wider portion. The narrower portion of the keyhole apertures 124 is of like size and shape so that a body portion of the pins 116 can fit through the narrower portion. The narrower portion of the keyhole apertures 124 are smaller than a diameter of the heads 126 of the pins 116. The lead-ins 125 are preferably placed in between the narrower portion and the wider portion of each keyhole aperture 124.

This allows the convex cover 110 to be placed over the plate system 104 by matching up the heads 126 of the pins protruding from the plate system 104, with the wider portion of each of the keyhole apertures 124. Next, the convex cover 110 is rotated slightly (in eighter a clockwise or counter-clockwise fashion, depending on design), so that the bodies of the pins 116 get secured in the narrower portions of the keyhole apertures 124 while also allowing the locking pin 128 to pop out and protrude through a locking pin aperture 136 on the cover 110. This secures the convex cover 110 in place on the wheel cover assembly 100 via a locking mechanism 132 (as shown in FIG. 8). The locking mechanism 132 resembles a twist and lock system.

Figure 9B:
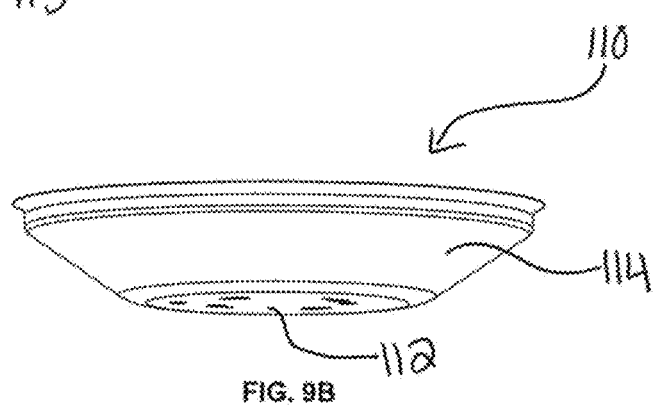
FIG. 9B shows a side view of the wheel cover assembly according to the embodiment shown in FIG. 9A.

FIG. 9B shows a side view of the convex cover 110. The tapered skirt 114 protrudes out from a base of the cover 110, so that the cover 110 protrudes out from a wheel when inserted on a wheel hub. The fastening plate 112 remains planar to attach to the plate system.

Figure 9C:
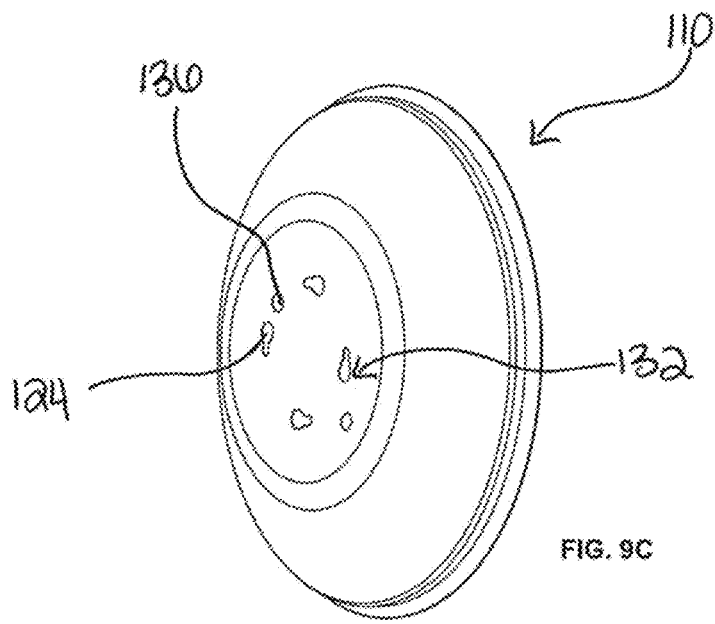
FIG. 9C shows an outer perspective view of the wheel cover assembly according to the embodiment shown in FIG. 9A.

FIG. 9C shows another perspective view of the convex cover 110. In addition to the keyhole apertures 124, the fastening plate 112 also includes at least one locking pin aperture 136. The locking pin aperture is present on the fastening plate 112 to accept at least a portion of the locking pin 128 protruding from the plate system 104.

Figure 10A:
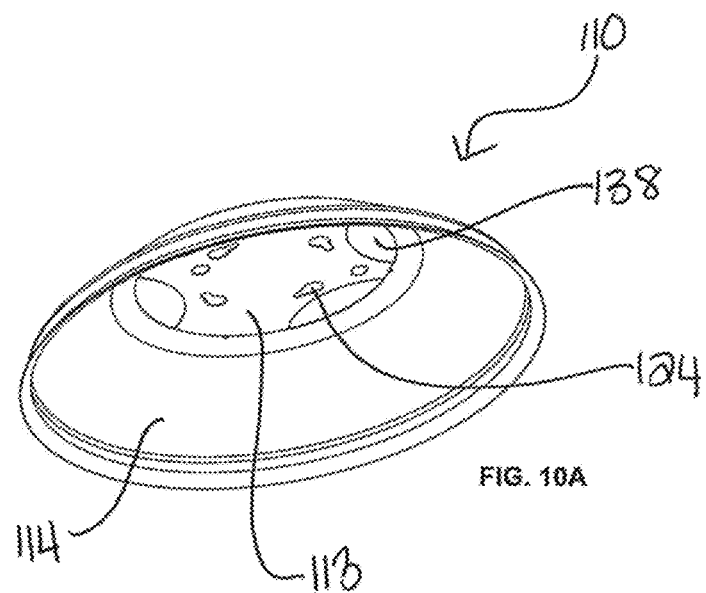
FIG. 10A shows an inner perspective view of a wheel cover assembly according to one embodiment of the invention.
Figure 10B:
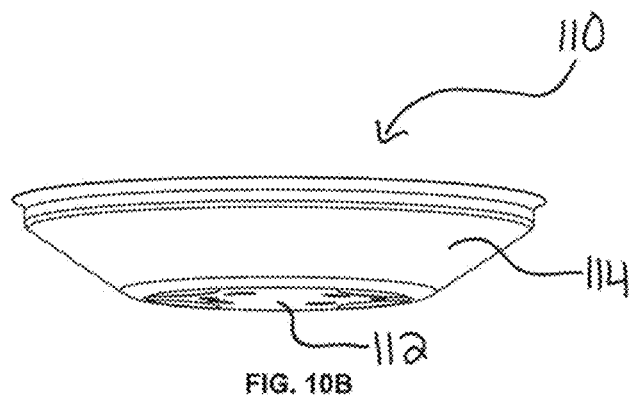
FIG. 10B shows a side view of the wheel cover assembly according to the embodiment shown in FIG. 10A.
Figure 10C:
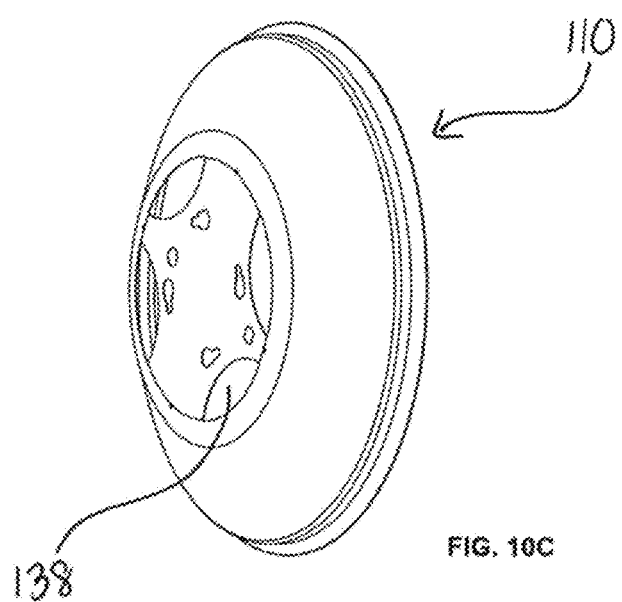
FIG. 10C shows an outer perspective view of the wheel cover assembly according to the embodiment shown in FIG. 10A.

In some embodiments of the invention, as shown in FIGS. 10A-10C, the convex cover 110 additionally includes one or more windows 138 on the fastening plate 112. The windows 138 are preferably transparent, although various colors and/or tints are also possible. Windows can also be present on the skirt portion of the cover if desired. Four windows 138 on the fastening plate 112 may be included as shown, however the window(s) can vary in quantity, shape and size. In one embodiment, the convex cover has one central window positioned on the fastening plate.

The windows provide a transparent see-through view of the basic wheel end components without the need to remove the convex cover. This saves time during inspections or other events by avoiding having to remove the cover via the twist and lock system using the keyhole apertures. Windows on the covers may be included on the front and/or rear axle wheels of a vehicle. The window(s) may be all or partially transparent with cut-outs if desired. The window and/or cut-outs can be made of any suitable transparent or semi-transparent material such as polycarbonate.

Figure 11A:
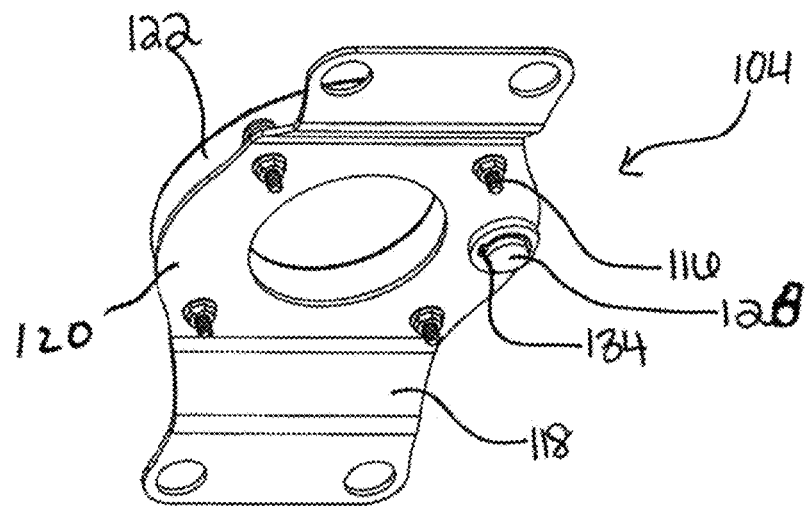
FIG. 11A shows a rear perspective view of a plate system according to one embodiment of the invention.
Figure 11B:
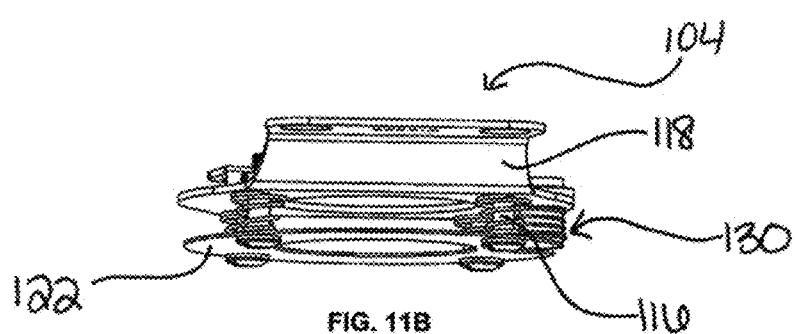
FIG. 11B shows a side view of the plate system according to the embodiment shown in FIG. 11A.
Figure 11C:
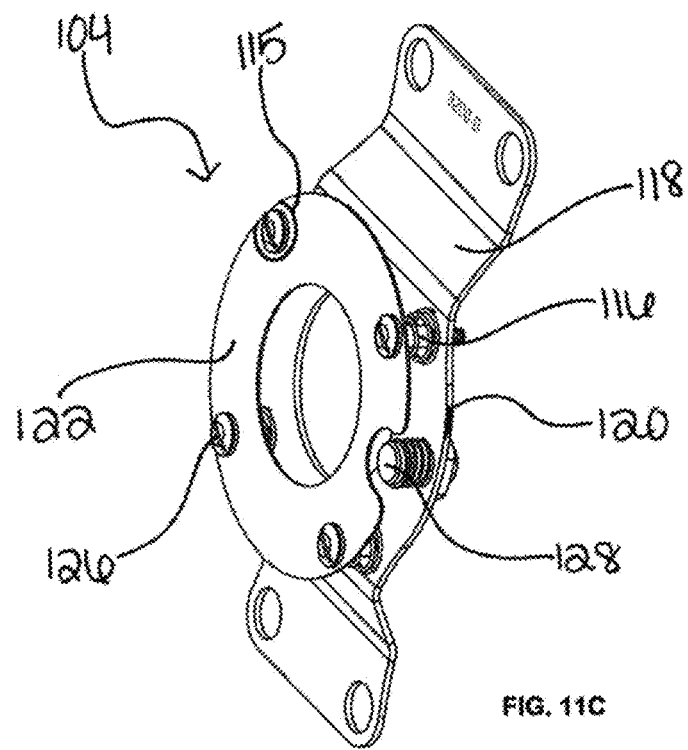
FIG. 11C shows a front perspective view of the plate system according to the embodiment shown in FIG. 11A.

FIGS. 11A-11C show the plate system 104. The base plate 118 affixes directly to the wheel hub 106. The base plate 118 is perforated to fit over and about the ends of studs extending from a hub. Nuts on some of the studs affix the bottom plate securely to the hub. The top plate 122 is affixed on top of the base plate 118 via the pins 116. The top plate 122 is spring mounted to an upstanding bracket 120. The upstanding bracket 120 is affixed to the base plate 118 with bolts and lock washers. The bolts are threaded into apertures in the plate 118.

Springs are also present on the bracket 120 and the pins 116 in between the base plate 118 and the top plate 122. Pressing evenly on the top plate 122 against the springs moves the plate downward for attachment of the convex cover, with a twist and lock motion of the cover.

The upstanding bracket 120 protrudes from underneath the base plate 118, through the top plate 122, to the locking pin aperture 136 on the convex cover 110. From underneath the base plate 118, best shown in FIG. 11A, the bracket includes a keyed lock 134. The keyed lock 134 is used to secure the cover in place once the cover is integrated with the plate system 104. The keyed lock 134 can be used in addition to, or instead of, the locking mechanism 132 discussed above.

The keyed lock 134 can guard against unauthorized removal of the cover. In some embodiments of the invention, a locking tab is attached to a knob or lock cylinder. The tab can be rotated approximately 90 to 270 degrees via the knob or a key to lock the convex cover to the top plate of the plate system. Once the key is withdrawn from the lock after such rotation, the convex cover is not removable from the plate system.

A center of the bracket, best shown in FIG. 11B, includes a height adjustment assembly 130. The height adjustment assembly 130 is present on the bracket 120 on an area between the base plate 118 and the top plate 122 so that the wheel cover assembly can be adjusted for application to wheels with various hub depths. In order to accommodate wheels and hubs of different depths, the bracket can have a series of pairs of apertures so that the wheel cover will be properly spaced apart from, and relative to, the rim of the wheel upon final assembly.

A top of the bracket 120, best shown in FIG. 11C, includes the locking pin 128 that fits into the locking pin aperture 136 on the convex cover. The cover can be detached from the wheel when necessary for inspection and cleaning, by pressing on the pin 128 and rotating the cover in an opposite direction to release the cover from under the pin heads.

Figure 12:
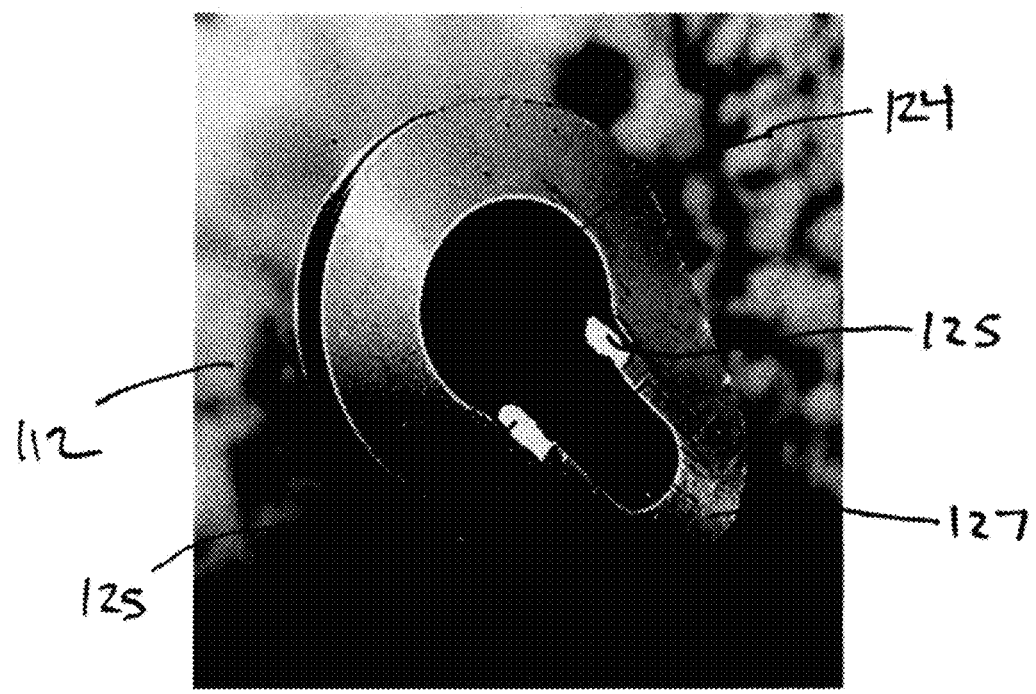
FIG. 12 shows a partial front view of a wheel cover assembly according to one embodiment of the invention.

FIG. 12 shows an enlarged view of a keyhole aperture 124 on a fastening plate 112. In this embodiment, the lead-ins 125 are shown between the narrow and wide portions of the keyhole aperture 124 for accepting a pin with or without a washer. Here, the keyhole aperture includes a hardened steel ring 127 that surrounds the keyhole aperture 124 and includes the lead-ins 125. As with adding hardened steel to a portion of the fastening plate or washers, the addition of the hardened steel ring 127 aids in the longevity and strength of the overall wheel cover assembly.

Figure 13:
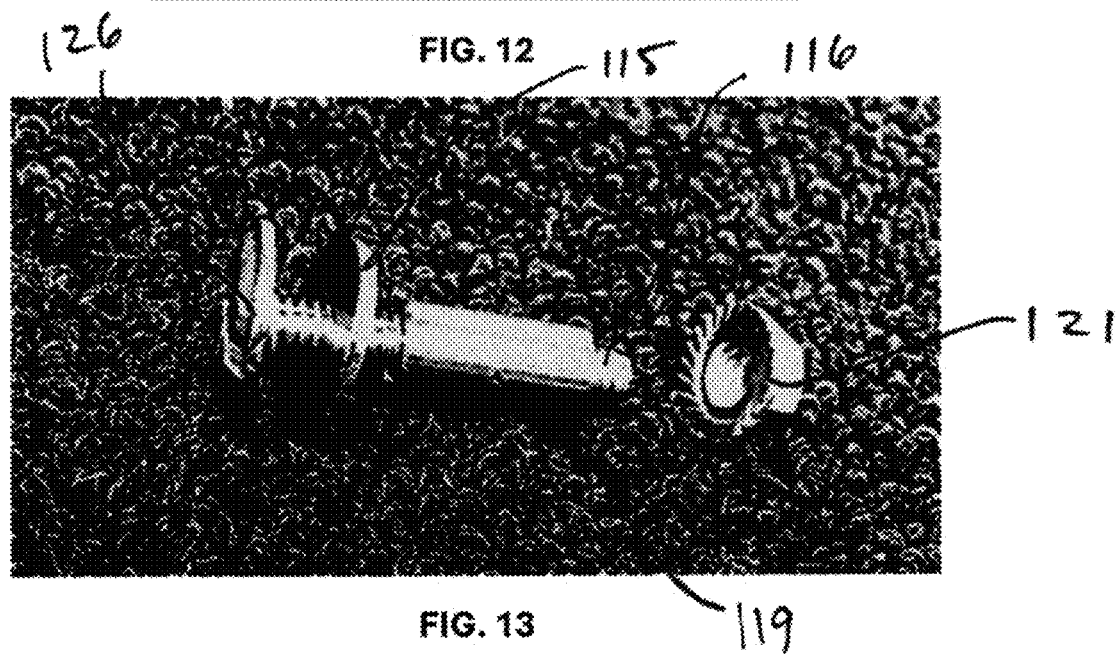
FIG. 13 shows a pin according to one embodiment of the invention.

FIG. 13 shows the washer 115 that can be added to the pin 116 below the head 126 of the pin 116. Here, the pin 116 includes a tube sleeve 119 that can be secured through the top plate, and to the base plate with a nut 121. The tube sleeve 119 is preferably made from stainless steel. When using a tube sleeve 119 in conjunction with a pin 116, the top plate can include clearance holes to fit around the tube sleeve to accommodate for the extra bulk the tube sleeve adds to the pin. The nut 121 helps secure the pin through the underside of the plate system. In some embodiments of the invention, the pins may include hurricane bolts. The hurricane bolts include a larger head size in comparison to the pins to allow for a greater surface area if washers are used in conjunction to the pins/bolts.

Embodiments of the subject invention can be applied to wheels on both rear and front axles of trucks. Wheel cover assemblies on front axles may be the same or different from wheel cover assemblies on rear axles. For installing the wheel cover assembly on front axles, at least about ⅜" of excess wheel stud should be exposed past lug nuts of a front wheel axle assembly of the vehicle. The excess protrusion of stud allows for adequate anchorage and installation of the convex covers.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A wheel cover assembly for a vehicle truck wheel, the wheel cover assembly comprising:
   a plate system adapted to accommodate a convex cover and to mount on a wheel hub along existing wheel bolts, wherein the plate system comprises
      a base plate affixed to a hub of the vehicle on which a wheel is also mounted;
      an upstanding bracket affixed to the base plate;
      a top plate spring mounted to the bracket and positioned to engage the convex cover; and
      a locking pin carried on the bracket and engaging the wheel cover when fully assembled to prevent its reverse rotation and loosening from the bracket;
   the convex cover adapted to slideably engage with the plate system, the convex cover having a generally planar fastening plate and an integrated skirt that tapers to an edge of the wheel; and
   a plurality of pins integrated with the plate system configured to receive the convex cover, the plurality of pins extending between the bracket and the top plate.

2. The wheel cover assembly of claim 1 wherein the plate system comprises:
   a base plate affixed to a hub of the vehicle on which a wheel is also mounted;
   an upstanding bracket affixed to the base plate;
   a top plate spring mounted to the bracket and positioned to engage the wheel cover;
   the plurality of pins extending between the bracket and the top plate.

3. The wheel cover assembly of claim 1 wherein the wheel cover includes keyhole apertures arranged circumferentially on the fastening plate for accepting heads of the pins.

4. The wheel cover assembly of claim 3 wherein the keyhole apertures have wider portions for engagement with the pins and narrower portions for engaging beneath the heads of the pins upon rotation of the convex cover.

5. The wheel cover assembly of claim 1, further comprising a locking pin carried on the bracket and engaging the wheel cover when fully assembled to prevent its reverse rotation and loosening from the bracket.

6. The wheel cover assembly of claim 1 wherein the upstanding bracket is configured to adjust away from the base plate.

7. The wheel cover assembly of claim 1, further comprising a height adjustment assembly in the bracket for adapting the assembly to wheels of different hub depths.

8. A wheel cover assembly for a vehicle wheel, the wheel cover assembly comprising:
   a plate system adapted to accommodate a convex cover and to mount on a wheel hub along existing wheel bolts, wherein the plate system comprises
      a base plate affixed to a hub of the vehicle on which a wheel is also mounted;
      an upstanding bracket affixed to the base plate;
      a top plate spring mounted to the bracket and positioned to engage the convex cover;
   the convex cover adapted to slideably engage with the plate system, the convex cover having a generally planar fastening plate and an integrated skirt that tapers to an edge of the wheel, wherein the convex cover carries integrally therein a locking mechanism for preventing removal of the wheel cover from the wheel of the vehicle; and a plurality of pins integrated with the plate system configured to receive the convex cover, the plurality of pins extending between the bracket and the top plate.

9. The wheel cover assembly of claim 8, wherein the locking mechanism comprises a keyed lock rotatable to engage the cover irremovably from the plate system.

10. The wheel cover assembly of claim 1 further comprising one or more transparent windows formed in the convex cover.

11. The wheel cover assembly of claim 10 wherein the one or more transparent windows are located along the fastening plate to permit a user to view the hub without removal of the convex cover.

12. The wheel cover assembly of claim 1 wherein the fastening plate comprises a different hardness than the integrated skirt.

13. The wheel cover assembly of claim 12 wherein the fastening plate is hardened steel and the integrated skirt is not.

14. The wheel cover assembly of claim 12 wherein an underside of the fastening plate is hardened steel.

15. The wheel cover assembly of claim 3 wherein the keyhole apertures comprise a hardened steel ring.

16. The wheel cover assembly of claim 1 wherein the integrated skirt does not make contact with the edge of the wheel, the wheel hub, or the wheel.

17. A wheel cover assembly comprising:
a plate system adapted to mount on a wheel hub, wherein the plate system includes a plurality of pins;
a convex cover adapted to slideably engage with the plurality of pins on the plate system so that the convex cover is maintained in position by heads on the pins, the convex cover having a generally planar fastening plate for engagement with the pins and an integrated convex skirt that generally covers an associated wheel;
wherein the convex cover carries integrally therein a keyed lock rotatable to engage the cover irremovably from the plate system; and
a central window positioned in the fastening plate.

18. The wheel cover assembly of claim 17 wherein the fastening plate comprises a different hardness than the integrated convex skirt.

19. The wheel cover assembly of claim 18 wherein the fastening plate is hardened steel and the integrated convex skirt is not.

20. The wheel cover assembly of claim 18 wherein an underside of the fastening plate is hardened steel.

* * * * *